US011972375B2

(12) United States Patent
Rohatgi et al.

(10) Patent No.: US 11,972,375 B2
(45) Date of Patent: Apr. 30, 2024

(54) PHASE-BASED ACCESS PERMISSIONS FOR MULTI-PHASE PROJECTS

(71) Applicant: Procore Technologies, Inc., Carpinteria, CA (US)

(72) Inventors: Anuj Rohatgi, Austin, TX (US); Michael Sinai, Los Angeles, CA (US); Ezra Simeloff, Austin, TX (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/380,878

(22) Filed: Jul. 20, 2021

(65) Prior Publication Data
US 2023/0025544 A1 Jan. 26, 2023

(51) Int. Cl.
*G06Q 10/0631* (2023.01)
*G06Q 10/0633* (2023.01)
*G06Q 50/08* (2012.01)

(52) U.S. Cl.
CPC ......... *G06Q 10/063114* (2013.01); *G06Q 10/06312* (2013.01); *G06Q 10/0633* (2013.01); *G06Q 50/08* (2013.01)

(58) Field of Classification Search
CPC .............................................. G06Q 10/063114
See application file for complete search history.

(56) References Cited

U.S. PATENT DOCUMENTS

| 7,305,392 | B1 * | 12/2007 | Abrams | G06Q 10/10 707/999.009 |
| 7,340,469 | B1 * | 3/2008 | Alghathbar | G06Q 10/06 |
| 8,255,829 | B1 * | 8/2012 | McCormick | G06Q 10/10 715/810 |
| 2006/0044307 | A1 * | 3/2006 | Song | G06T 11/206 345/419 |
| 2008/0077593 | A1 * | 3/2008 | Abrams | G06Q 10/06 707/999.009 |

(Continued)

OTHER PUBLICATIONS

Rahimian et al, On-demand monitoring of construction projects through a game-like hybrid application of BIM and machine learning, Automation in Construction, vol. 110, Feb. 2020, 103012 (Year: 2020).*

(Continued)

*Primary Examiner* — Andre D Boyce
(74) *Attorney, Agent, or Firm* — Lee Sullivan Shea & Smith LLP

(57) ABSTRACT

An example computing system is configured to: (i) apply a first access permission setting that defines whether a party can access a data object associated with a multi-phase construction project during a first phase of the multi-phase construction project; (ii) determine that the multi-phase construction project has transitioned from the first phase to a second phase; and (iii) based at least on the determination that the multi-phase construction project has transitioned from the first phase to the second phase, apply a second access permission setting that defines whether the party can access the data object associated with the multi-phase construction project during the second phase of the multi-phase construction project, where the second access permission setting differs from the first access permission setting.

12 Claims, 7 Drawing Sheets

(56) References Cited

U.S. PATENT DOCUMENTS

| | | | | |
|---|---|---|---|---|
| 2008/0140485 | A1* | 6/2008 | Williams | G06Q 10/06395 705/7.41 |
| 2008/0228815 | A1* | 9/2008 | Senn | G06Q 10/06 |
| 2008/0301142 | A1* | 12/2008 | Marolf | G06Q 10/06 707/999.009 |
| 2010/0185547 | A1* | 7/2010 | Scholar | G06Q 10/06 707/754 |
| 2011/0107231 | A1* | 5/2011 | Gueldemeister | G06Q 10/10 715/745 |
| 2012/0316930 | A1* | 12/2012 | Clemenson | G06Q 10/06 705/7.11 |
| 2013/0132334 | A1* | 5/2013 | Reisdorf | G06Q 10/101 707/E17.008 |
| 2014/0279694 | A1* | 9/2014 | Gauger | G06Q 40/06 705/36 R |
| 2015/0006393 | A1* | 1/2015 | Allin | G06Q 30/04 705/44 |
| 2017/0091879 | A1* | 3/2017 | Kanner | G06Q 10/10 |
| 2017/0193412 | A1* | 7/2017 | Easton | G06Q 10/06313 |
| 2017/0315697 | A1* | 11/2017 | Jacobson | G06F 16/26 |
| 2019/0180039 | A1* | 6/2019 | Considine | G06F 21/6218 |
| 2019/0220796 | A1* | 7/2019 | Khalil | G06Q 40/08 |
| 2020/0127843 | A1* | 4/2020 | Webster | G06Q 20/389 |
| 2020/0380081 | A1* | 12/2020 | Rossi | G06Q 10/067 |
| 2021/0110347 | A1* | 4/2021 | Khalil | G06Q 30/08 |
| 2021/0295266 | A1* | 9/2021 | McKee | G06F 30/13 |
| 2021/0350310 | A1* | 11/2021 | Tashkin | G06Q 10/063118 |
| 2022/0164738 | A1* | 5/2022 | Liu, Jr. | G06Q 10/107 |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

PHASE-BASED ACCESS PERMISSIONS FOR MULTI-PHASE PROJECTS

BACKGROUND

Construction projects are often complex endeavors involving the coordination of many professionals across several discrete phases. Typically, after negotiation between parties involved in a construction project is complete and the scope of the construction project is agreed upon, the construction project commences with a design phase, where architects design the overall shape and layout of the construction project, such as a building. Next, engineers engage in a planning phase where they take the architects' designs and produce engineering drawings and plans for the construction of the project. At this stage, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

To manage these and other phases of a construction project successfully from initiation to completion, parties involved in a construction project need to be able to interact and share project information effectively.

OVERVIEW

A construction project may require significant collaboration and coordination between different multiple parties throughout the various phases of the construction project. For instance, a construction company may be responsible for funding a given construction project for a building and collaborating with an architect on its design. The architect may then collaborate with a general contractor on the construction of the building. In turn, the general contractor may hire one or more subcontractors to collaborate and coordinate on various aspects of the building, which may require the general contractor and the one or more subcontractors to exchange various project information (e.g., drawings, design requirements, building codes, regulations, action items, etc.).

The collaboration that takes place between different parties involved in a construction project may take various forms. As one possibility, a given subcontractor may require specific information in order to complete a given construction task and may inquire about such information by sending the general contractor a Request for Information ("RFI"). As another possibility, an engineer may wish to revise one or more given drawings to update schematic information related to the construction project. As yet another possibility, a construction professional may wish to capture and upload images while conducting an on-site inspection of a given area of the construction project. As further yet another possibility, one or more unforeseen obstacles may arise throughout the lifecycle of the construction project, which may require two or more parties to collaborate on various tasks, such as renegotiating a given contract, revising a given form, or updating a given budget, among other possibilities. Many other types of collaborations are possible and may require different parties, each of which may be responsible for a certain aspect of the construction project, to communicate and coordinate efficiently regarding the various aspects of the construction project and various data relating to the construction project.

Unfortunately, the collaboration that takes place between different parties involved in a construction project can be complicated and cumbersome, giving rise to inefficiencies. As one example, outstanding requests from one party to another may be inadvertently overlooked and may require several follow-ups to obtain the information required in order to proceed with a given task/phase of the construction project. As another example, given information may undergo several rounds of revisions, especially if input from multiple parties is required, which may increase the difficulty of tracking revisions to the information and ensuring that the most up-to-date version of the information is easily identifiable and accessible. Other examples of inefficiencies are also possible.

In view of the foregoing, software applications have been developed to assist with the task of managing a construction project electronically. For instance, Procore Technologies, Inc., who is the assignee of the present application, offers a construction management software application that includes various software features or tools to help facilitate collaboration between different parties involved in a construction project.

In practice, a construction management software application may be provided to a user in the form of a software as a service ("SaaS"), in which case the software application may include a front-end software component running on a user's client station and a back-end software component running on a back-end platform that is accessible to the user's client station via a communication network, such as the Internet. Further, in practice, the back-end platform associated with a construction management SaaS application may be capable of serving multiple different parties that have signed up for access to the construction management SaaS application, where each such party has its own respective account for the construction management SaaS application.

Some construction management SaaS applications (such as the one offered by Procore Technologies, Inc.) provide construction professionals and other users who are involved in a construction project with the ability to collaborate electronically throughout the lifecycle of the project, spanning from inception to completion. While construction management SaaS applications help streamline the collaboration between involved parties, one of the challenges that must be considered and addressed by such applications is management of data that is created in connection with the project.

Generally, two key concepts inform how data is managed by a SaaS application: data access permissions and data retention rights. Access permissions may define what project data a party may access and what actions the party may perform with respect to that project data. Retention settings may define a party's right to retain a copy of project data in the event that the party's access to the project data is revoked.

In one data management approach, a first party may create a "project data entity" or "project entity" representing a construction project within the SaaS application for managing "data objects" related to the construction project. A data object may take various forms, such as a document (e.g., a legal contract, a form, a budget, etc.), a drawing file (e.g., a schematic, a blueprint, etc.), an image file, or a template (e.g., a project template, a permissions template, etc.). Other examples are also possible. Further, the SaaS application may provide various software features (also referred to as tools) for managing the data objects.

As the creator of the project, the first party is designated as the project owner of the construction project. The project owner may wish to collaborate with one or more other parties with respect to certain data objects related to the construction project. These other parties may be referred to as collaborators. To facilitate this collaboration, the SaaS application may allow the project owner to invite a given collaborator to collaborate with respect to the construction project. As part of this process, the collaborator may be assigned a set of access permission and retention settings for the data objects related to the construction project. These access permission and retention settings could be dictated by the project owner or could be set in some other way (e.g., the settings may be a default set of collaborator settings that are predefined by the SaaS application provider). Further, the set of access permission and retention settings could be the same for all types of data objects related to the construction project, or the settings could differ based on the type of a given data object.

In existing construction management SaaS applications, after a collaborator's access permissions are initially defined, managing and/or updating those access permission settings typically requires a user (e.g., an employee of the project owner or another authorized party) to access a permissions interface for the construction project and/or the data objects related thereto and then manually change the collaborator's access permission settings via that permissions interface. When managing access permission settings for individual data objects, this may involve accessing a separate permissions interface for each individual data object and changing the settings via each separate permissions interface. This can become overly time consuming and cumbersome when managing access permissions for multiple individual data objects. Further, as the complexity or scale of a construction project increases, this problem can become even more acute.

This existing technology for managing and/or updating access permissions for data objects related to a construction project is further complicated by the fact that, over the course of a construction project, the project may transition through a number of different phases during which different parties may need access to different data objects related to the construction project. Examples of such phases may include a bidding phase where contractors submit bids for performing various aspects of the project, a design phase where architects design the overall shape and layout of the construction project, a planning phase where engineers design various portions of the project's infrastructure and produce engineering drawings and plans based on the architectural and engineering designs, a logistics phase where contractors review these plans and begin to allocate various resources to the project, a construction phase where construction professionals begin to construct the project based on the finalized plans, and a post-construction phase where managers or other construction professionals perform a project closeout process including identifying any punch list items, completing inspections, cleaning the job site, and organizing relevant documents for transfer to the owner of the job site.

As the construction project transitions from phase to phase, it may therefore be desirable to update the access permissions of certain collaborators such that they can access certain data objects associated with the construction project. For instance, during the bidding phase it may be desirable to provide contractors with access bid documents, during the design phase it may be desirable to provide architects with able to access design tools and design documents, during the planning phase it may be desirable to provide engineers with access design tools, design documents, drawing tools, and drawing documents, and so on.

Further, when a given phase ends, it may be desirable to update the access permissions of certain collaborators such that their previously-granted access to certain data objects associated with the construction project is revoked, which may help to limit the parties that can access data objects to only those that need access. For instance, when the bidding phase ends it may be desirable to revoke access to the construction project's data objects entirely for any contractors who did not submit a winning bid and/or to limit access permissions for the winning contractors such that they can only access the bid documents in a read-only mode.

While there is a potential desire or need to update the access permissions of multiple different collaborators as the construction project transitions from phase to phase, the existing technology for managing access permissions makes it very difficult to do so. Under the existing technology, every time the construction project transitions between phases, the access permissions for each collaborator impacted by the phase transition would have to be updated on an object-by-object basis. This could mean having to interact with access permissions interfaces for hundreds, or even thousands, of data objects every time the project changes phases. As a result, it may simply be impractical or unfeasible using existing software technology to update access permissions as the construction project transitions through its phases.

Further, in addition to being impractical or unfeasible, managing access permissions on a phase-by-phase basis using the existing software technology may be prone to error. Because the existing technology requires a user to manually update the access permissions, it is possible that the user could forget to change the access permissions for certain data objects or collaborators, or that the user could inadvertently overlook certain data objects or collaborators when changing access permissions. This could result in additional problems when carrying out the construction project, such as project delays or miscommunications.

To help address the above-mentioned and other problems, disclosed herein is software technology that enables automatic management of access permissions for parties collaborating on a multi-phase construction project, which may facilitate improved collaboration between multiple parties collaborating on the multi-phase construction project and may also facilitate improved management of data related to the multi-phase construction project. In accordance with the present disclosure, access permissions for the parties may be automatically configured based on phase transitions during the multi-phase construction project. For instance, when it is determined that a construction project has entered a new phase, new access permissions can be granted to a first set of one or more parties that are involved in the new phase, while previously-granted access permissions can be revoked for a second set of one or more parties that are not involved in the new phase.

In this respect, the access permissions that are granted and/or revoked based on the determination that the construction project has entered the new phase could either be applied across all data objects (and/or associated software features) related to the construction project or could be applied to a specific subset of the data objects (and/or associated software features) related to the construction project. For instance, when it is determined that the construction project has entered the new phase, one collaborator could be granted access to the entire universe of data objects related to the construction project, while another collaborator could be granted access to a specific subset of data objects that are related only to the new phase of the construction project. Likewise, when it is determined that the construction project has entered the new phase, one collaborator could have their access revoked for the entire universe of data objects related to the construction project, while another collaborator could have their access revoked for one subset of data objects related to the construction project (e.g., data objects that were specifically related to the prior phase of the construction project) but could retain access for another subset of data objects related to the construction project.

The disclosed software technology may provide various benefits over existing software technology for managing access to data objects related to a multi-phase construction project. For instance, the disclosed software technology may improve an efficiency of the management of the construction project by reducing the amount of time and energy that would otherwise be required to manually configure and reconfigure phase-based access permissions throughout the course of the construction project as it transitions from phase to phase. As another example benefit, the disclosed software technology may help improve collaboration between parties on a multi-phase construction project by limiting a collaborator's access to only those data objects that are useful to the collaborator during the current phase of the construction project. Further, the disclosed software technology may help limit unwanted access and/or changes to data for the construction project by preventing unauthorized parties from being able to access confidential data during certain phases of the construction project or from being able to manipulate data once a given phase of the construction project has been completed. Further yet, the disclosed software technology may provide a meaningful benefit for tracking the phases of the construction project. Existing software technology may allow a project owner to specify a current phase of the construction project, but such information may be informative only without impacting the functionality of other features of the software. The disclosed software technology, on the other hand, may use the current phase information to grant and/or revoke access permissions to various features and/or data objects related to the construction project.

In accordance with the above, in one aspect, disclosed herein is a method that involves a computing system (i) applying a first access permission setting that defines whether a party can access a data object associated with a multi-phase construction project during a first phase of the multi-phase construction project; (ii) determining that the multi-phase construction project has transitioned from the first phase to a second phase; and (iii) based at least on the determination that the multi-phase construction project has transitioned from the first phase to the second phase, applying a second access permission setting that defines whether the party can access the data object associated with the multi-phase construction project during the second phase of the multi-phase construction project, where the second access permission setting differs from the first access permission setting.

In another aspect, disclosed herein is a computing system that includes at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example System Configuration

The present disclosure is generally directed to software technology for managing data for, and facilitating collaboration on, construction projects, and in particular to a computing system and methods for managing data, data access, and data retention. As one possible implementation, this software technology may include both front-end software running on client stations that are accessible to individuals associated with construction projects (e.g., contractors, project managers, architects, engineers, designers, etc., each of which may be referred to generally herein as a "construction professional") and back-end software running on a back-end computing platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end computing platform. The software technology disclosed herein may take other forms as well.

In general, such front-end client software may enable one or more individuals responsible for a construction project to perform various tasks related to the management of the construction project, which may take various forms. According to some implementations, these tasks may include, as some non-limiting examples, creating, accessing, and/or editing one or more data objects, managing access permissions and data retention settings for data objects, inviting one or more parties to collaborate on a given project, and engaging in collaboration with one or more parties on a given construction project via one or more data objects. Further, such front-end client software may take various forms, examples of which may include a native application (e.g., a mobile application), a web application running on a client station, and/or a hybrid application, among other possibilities.

Figure 1:
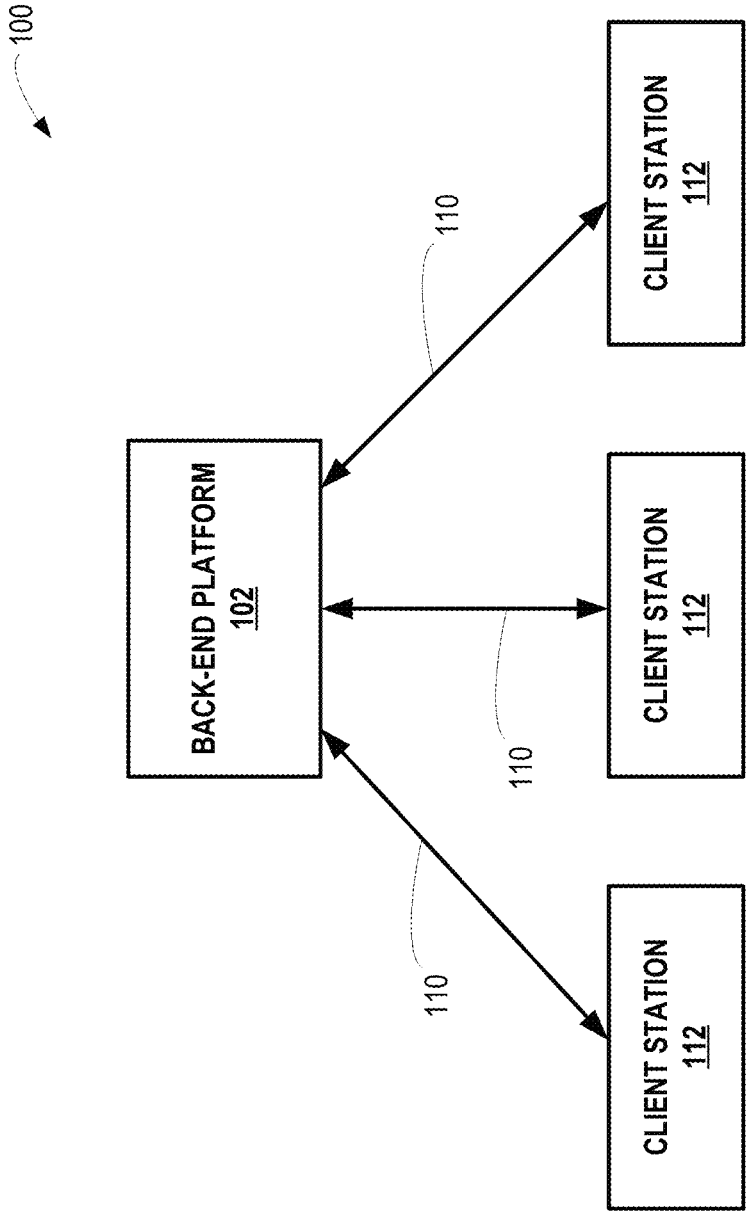
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been provisioned with software for carrying out one or more of the functions disclosed herein, including but not limited to providing tools and/or interfaces for (i) creating, accessing, and editing one or more project entities, (ii) creating, accessing, and editing data objects related to a given project entity, and (iii) maintaining and updating a given party's access permissions and retention settings with respect to a given data object. The one or more computing systems of back-end computing platform 102 may take various forms and may be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 is configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

The interaction between client stations 112 and back-end computing platform 102 may take various forms. As one possibility, client stations 112 may send certain user input related to a construction project to back-end computing platform 102, which may in turn trigger back-end computing platform 102 to take one or more actions based on the user input. As another possibility, client stations 112 may send a request to back-end computing platform 102 for certain project-related data and/or a certain front-end software module, and client stations 112 may then receive project-related data (and perhaps related instructions) from back-end computing platform 102 in response to such a request. As yet another possibility, back-end computing platform 102 may be configured to "push" certain types of project-related data to client stations 112, such as rendered three-dimensional views, in which case client stations 112 may receive project-related data (and perhaps related instructions) from back-end computing platform 102 in this manner. As still another possibility, back-end computing platform 102 may be configured to make certain types of project-related data available via an API, a service, or the like, in which case client stations 112 may receive project-related data from back-end computing platform 102 by accessing such an API or subscribing to such a service. The interaction between client stations 112 and back-end computing platform 102 may take various other forms as well.

Although not shown in FIG. 1, back-end computing platform 102 may also be configured to receive data, such as data related to a construction project, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING SYSTEM

Figure 2:
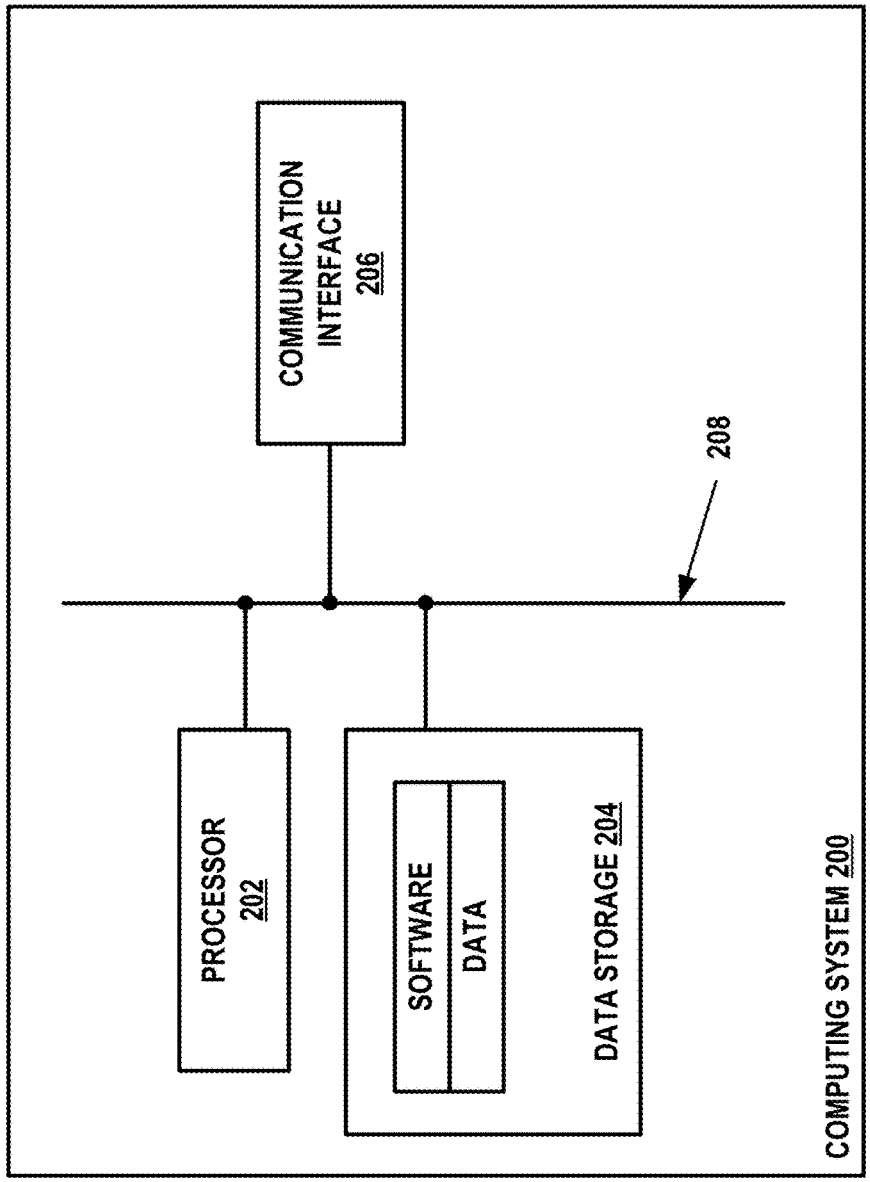
FIG. 2 depicts an example computing system that may be configured to carry out one or more of the functions of the present disclosure.

FIG. 2 is a simplified block diagram illustrating some structural components that may be included in an example computing system 200, which could serve as, for instance, the back-end computing platform 102 and/or one or more of client stations 112 in FIG. 1. In line with the discussion above, computing system 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing system 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store project-related data in one or more databases, file systems, or the like. Data storage 204 may take other forms and/or store data in other manners as well.

Communication interface 206 may be configured to facilitate wireless and/or wired communication with configured other computing systems or devices, such as one or more client stations 112 when computing system 200 serves as back-end computing platform 102, or as back-end computing platform 102 when computing system 200 serves as one of client stations 112. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing system 200 may additionally include one or more other interfaces that provide connectivity with external user-interface components (sometimes referred to as "peripherals"), such as a keyboard, a mouse or trackpad, a display screen, a touch-sensitive interface, a stylus, a virtual-reality headset, speakers, etc., which may allow for direct user interaction with computing system 200. Additionally or alternatively, computing system 200 may itself include one or more integrated user interface components, such as a display screen, a touch-sensitive interface, a keyboard, speakers, a microphone, a camera, etc., which may allow for direct user interaction with computing system 200.

It should be understood that computing system 200 is one example of a computing system that may be used with the embodiments described herein. Numerous other arrangements are possible and contemplated herein. For instance, other computing systems may include additional components not pictured and/or more or fewer of the pictured components.

III. Example Operations

As mentioned above, the present disclosure relates to software technology that enables automatic management of access permissions for parties collaborating on a multi-phase construction project, which may facilitate improved collaboration between multiple parties collaborating on the multi-phase construction project and may also facilitate improved management of data related to the multi-phase construction project. In accordance with the present disclosure, access permissions for the parties may be automatically configured based on phase transitions during the multi-phase construction project. For instance, when it is determined that a construction project has entered a new phase, new access permissions can be granted to a first set of one or more parties that are involved in the new phase, while previously-granted access permissions can be revoked for a second set of one or more parties that are not involved in the new phase.

In this respect, the access permissions that are granted and/or revoked based on the determination that the construction project has entered the new phase could either be applied across all data objects (and/or associated software features) related to the construction project or could be applied to a specific subset of the data objects (and/or associated software features) related to the construction project. For instance, when it is determined that the construction project has entered the new phase, one collaborator could be granted access to the entire universe of data objects related to the construction project, while another collaborator could be granted access to a specific subset of data objects that are related only to the new phase of the construction project. Likewise, when it is determined that the construction project has entered the new phase, one collaborator could have their access revoked for the entire universe of data objects related to the construction project, while another collaborator could have their access revoked for one subset of data objects related to the construction project (e.g., data objects that were specifically related to the prior phase of the construction project) but could retain access for another subset of data objects related to the construction project.

While the present disclosure is described in connection with multi-phase construction projects, it should be understood this is for illustrative purposes and that the present disclosure can be applied to various other types of multi-phase projects as well. For instance, the present disclosure can be applied to any multi-phase project for which it is desirable to automatically adjust access permissions when the project transitions between phases.

a. Example Data Storage Models

In some examples, the present disclosure can be applied in connection with an account-centric data storage model in which projects and related project data are created, stored, and maintained under a single given account (in which case the data objects may be shared with other parties collaborating on the project to facilitate access to such data objects but may generally remain under the control of the one single holder of the given account), while in other examples, the present disclosure can be applied in connection with a project-centric data storage model in which project data is created, stored, and maintained under a project entity that exists separately from any one party's account (in which case connections may be established between parties collaborating on the project and the data objects under the project entity in order to facilitate access to such data objects). Examples of account-centric and project-centric data storage models are described in U.S. patent application Ser. No. 17/191,484 titled "Computer System and Methods for Managing Data, Data Access, and Data Retention," which is assigned to the present applicant Procore Technologies, Inc. and incorporated herein by reference in its entirety.

Regardless of the type of data storage model being used, the construction management SaaS application may include mechanisms for controlling how various parties collaborate on a project entity and/or its associated data objects.

In general, a party may be represented by a data entity (e.g., an account) that is encoded with data including relevant information about the party. A party may be an individual (e.g., a human user) or a company (e.g., a business entity). A data entity that represents an individual party may be managed by the individual. For example, a party that represents an employee of a construction company may be managed by the employee herself or himself. A data entity that represents a company party may also be managed by an individual. For example, a given company may have a designated employee (e.g., account manager) who is responsible for managing the data entity that represents the company and performing various tasks on behalf of the company via the company's data entity.

In an account-centric data model, each party may have an account with the construction management SaaS application, and each party's access permissions and retention settings may be defined in connection with the party's account. In such a model, each party may have an individualized set of access permissions included as part of the account, or a given party could have a specified "role" that is associated with a predefined set of role-based access permissions. A party's role may include the party's job function, department, employer, industry, or any other categorization that may be useful when defining access permissions settings for multiple parties in a similar way.

Figure 3:
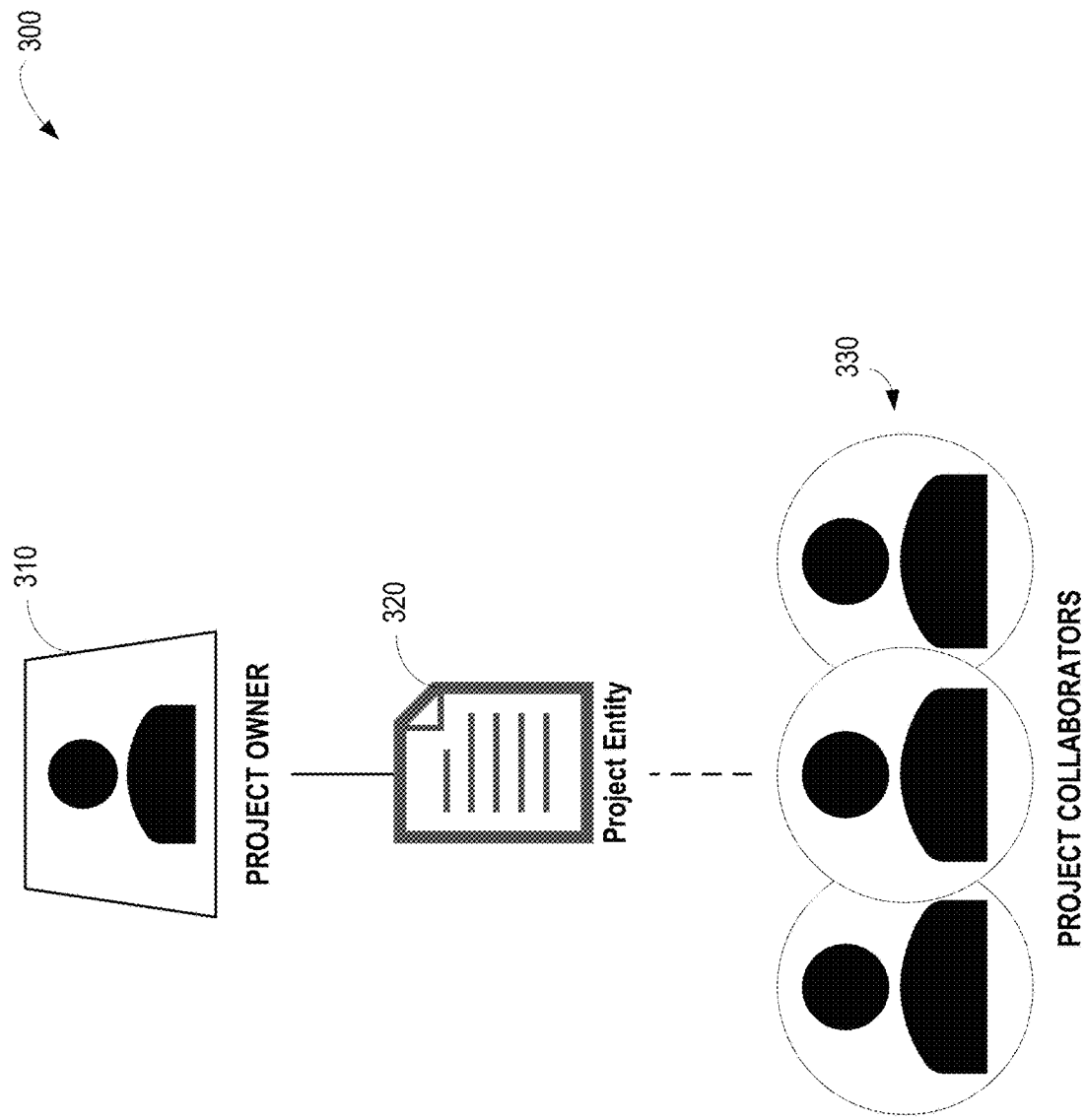
FIG. 3 depicts an example diagram of a relationship structure for enabling collaboration between parties related to a construction project.

To illustrate, FIG. 3 depicts a diagram 300 of an account-centric data management structure. A project owner 310 may create a project entity 320 that represents a given construction project, and the project entity 320 is stored under the project owner's existing customer account. The project owner 310 may then invite other parties, shown as collaborators 330, to access and collaborate on the project entity 320. After being invited to collaborate on the project entity 320, each of the collaborators 330 may log into their respective accounts and accept the project owner's invitation to access the project entity 320. Upon accepting the invitation, the respective access permissions and retention settings stored in association with the accounts of the collaborators 330 may be updated to define whether and how the collaborators 330 can access the project entity 320.

Conversely, in a project-centric model, each party may be represented by a data entity that exists separately from the project entity and its associated data objects, and each party's access permissions may be defined separately from the party's account through "connections" with data objects. Each connection may take the form of a data structure that defines a relationship between the party and the data object, including information about the party's access permissions for the data object.

Figure 4:
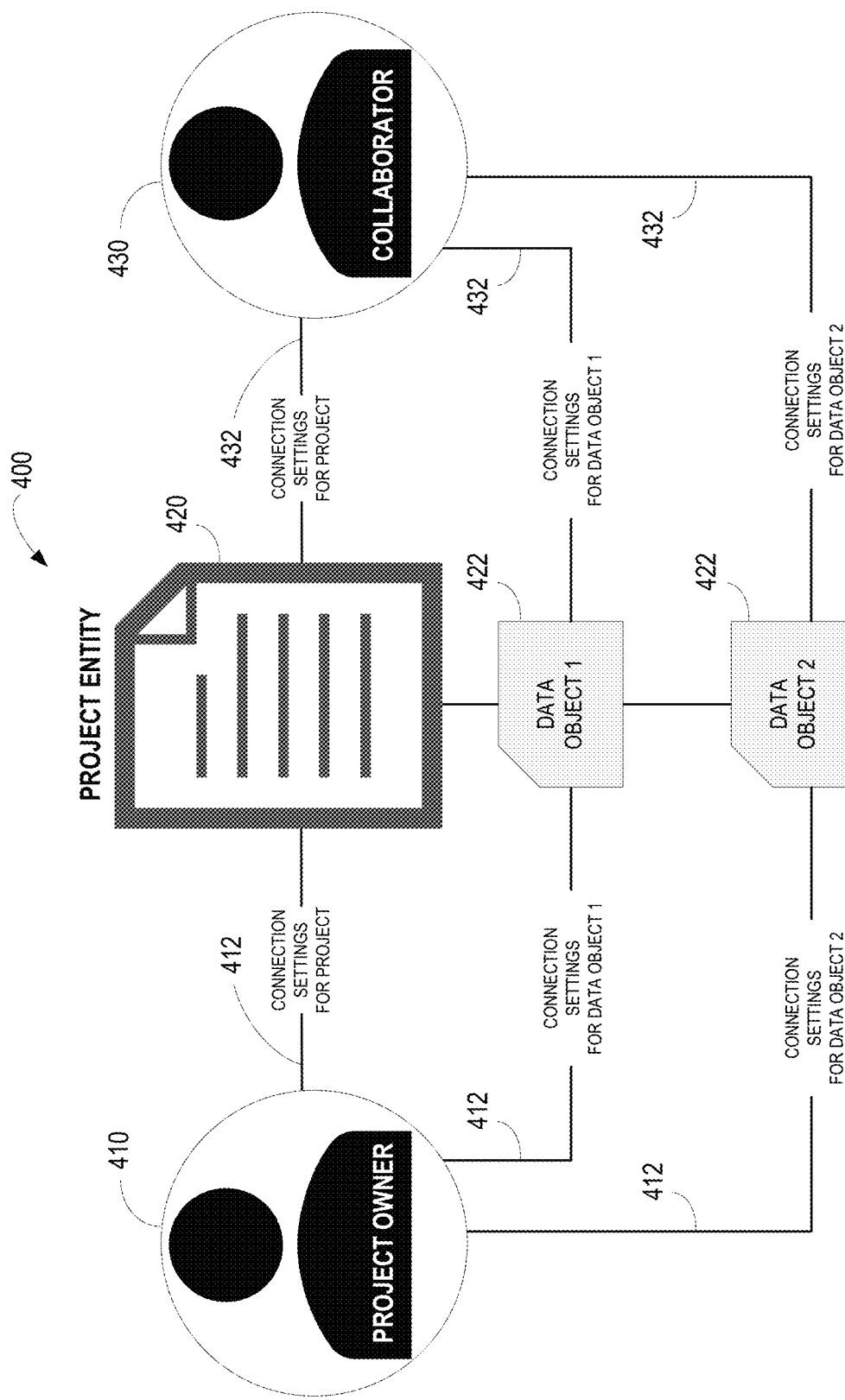
FIG. 4 depicts an example diagram of a relationship structure for enabling collaboration between parties related to a construction project.

To illustrate, FIG. 4 depicts a diagram 400 of project-centric data management structure. A project owner 410 may create a project entity 420 that represents a given construction project, and the project entity 420 may be stored as an independent entity within the SaaS application rather than an entity within the account of the project owner 410. Creation of the project entity 420 may establish respective connections 412 between (i) the project owner 410 and (ii) project entity 420 and its related data objects 422. Each of the connections 412 may be associated with connection data that includes the project owner's data access permissions and data retention settings with respect to the project entity 420 and the data objects 422. The project owner 410 may then invite one or more additional parties, shown as collaborator 430, to access and collaborate on the project entity 420. The collaborator 430 may log into its account and accept the project owner's invitation to access the project entity 420. The collaborator's acceptance of the project owner's invitation to access the project 420 may in turn establish respective connections 432 between (i) the collaborator 430 and (ii) the project entity 420 and its related data objects 422. Each of the connections 432 may be associated with connection data that includes the collaborator's data access permissions with respect to the project entity 420 and the data objects 422.

Both the account-centric data management structure depicted in FIG. 3 and the project-centric data management structure depicted in FIG. 4 provide mechanisms for managing data access permissions. As described in further detail below, these data access permissions can be managed on a phase-by-phase basis to update the permissions as a multi-phase construction project transitions through its phases.

b. Phase-Based Access Permissions

In line with the discussion above, the disclosed software technology enables phase-based management of access permissions for any party that is collaborating on a multi-phase construction project. At a high level, phase-based management of access permissions may involve configuring an initial set of access permissions for a collaborator, determining that the multi-phase construction project has transitioned from one phase to another, and, based on this determination, updating the set of access permissions for the collaborator. Each of these steps are explained in further detail below in connection with FIG. 5.

Figure 5:
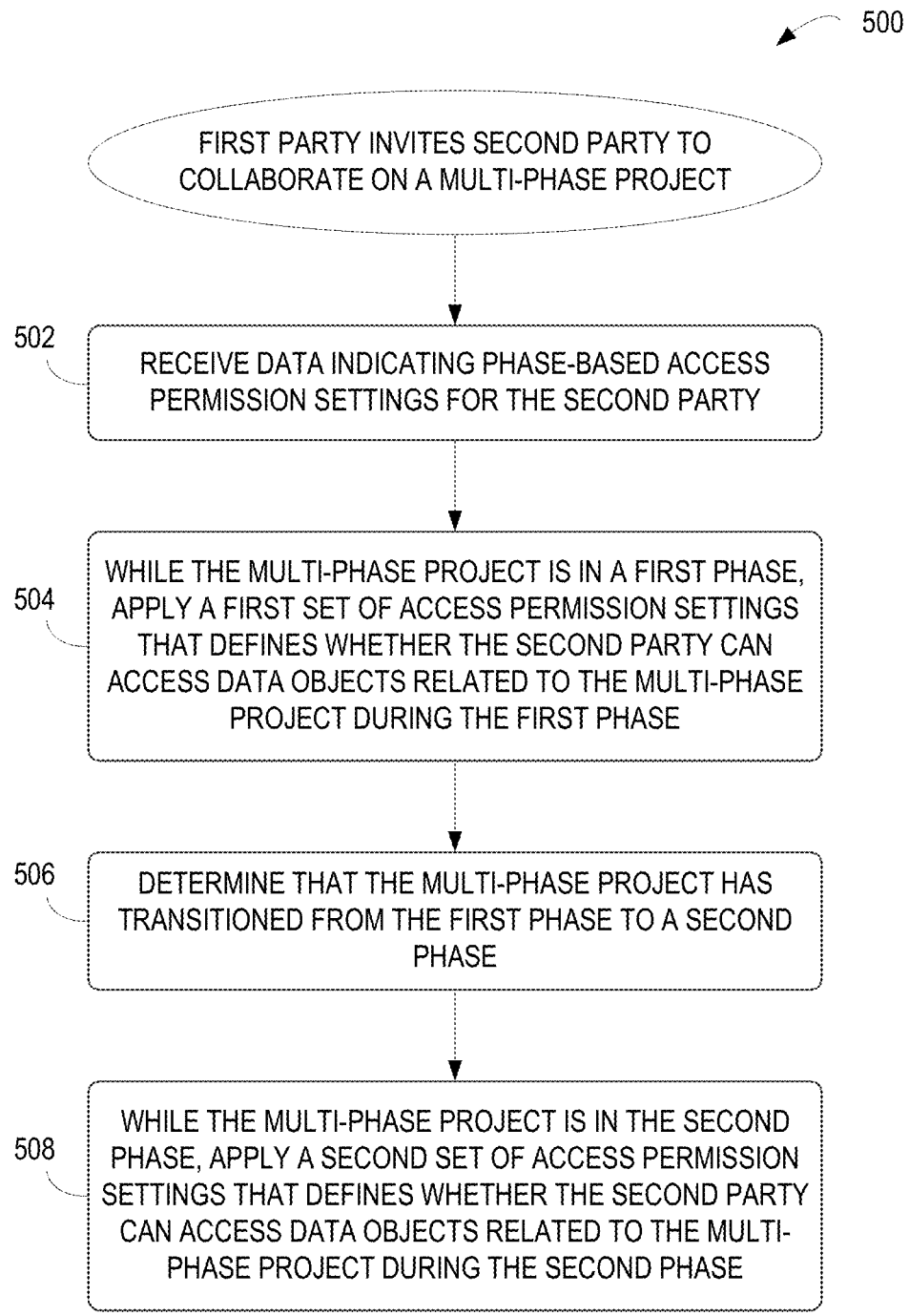
FIG. 5 depicts an example workflow that may be implemented by a computing platform to configure access permissions and retention settings for a given party.

FIG. 5 depicts an example process 500 that may be carried out by a computing platform in order to automatically control a collaborator's access permissions for a project entity and/or its associated data objects. It should be understood that each block in flow diagram 500 may represent a module or portion of program code that includes instructions that are executable by a processor to implement specific logical functions or steps in a process. The program code may be stored on any type of computer-readable medium, such as non-transitory computer readable media (e.g., data storage 204 shown in FIG. 2). In other cases, a block in the flow diagram 500 may represent circuitry that is wired to perform specific logical functions or steps in a process. Moreover, the blocks shown in the flow diagram 500 may be rearranged into different orders, combined into fewer blocks, separated into additional blocks, and/or removed, based upon the particular embodiment. The flow diagram 500 may also be modified to include additional blocks that represent other functionality that is described expressly or implicitly elsewhere herein.

Further, as a general matter, when reference is made herein to a "computing platform" engaging in one or more operations, it should be understood that such operations may, in practice, be carried out by one or more computing systems executing one or more instances of the disclosed software technology. In particular, it should be understood that such example operations may be carried out by a back-end computing platform, such as the back-end computing platform 102 depicted in FIG. 1, but it should be understood that other implementations are possible as well.

In general, the example process 500 may be initiated when a first party, such as a project owner, invites a second party, such as a subcontractor, to collaborate with respect to a multi-phase construction project. However, the example process 500 may be initiated at other times as well depending on the implementation, such as after the second party has already begun collaborating on the multi-phase construction project.

The example process 500 may begin at step 502, where the computing platform may receive data indicating phase-based access permission settings for the second party. The computing platform may receive such data in various manners.

As one possibility, the computing platform may receive information specifying a role or job function of the second party. For instance, the first party may provide this information during the course of setting up the collaboration relationship with the second party. When inviting the second party to collaborate on the multi-phase construction project, the first party may provide to the computing platform information identifying the second party, and this identifying information may include the role of the second party. In other examples, the first party may specify the role of the second party separately from setting up the collaboration relationship. For instance, the computing platform may be configured to store information identifying the roles of any collaborators of a project entity in connection with the project entity data, and the computing platform may provide an interface through which the first party may update the identified roles. As yet another example, information identifying the role of the second party may be stored in connection with the second party's account such that the computing platform may determine the second party's role based on the second party's account information.

The computing platform may determine phase-based access permission settings for the second party based on the specified role of the second party. To facilitate this, the computing platform may be provisioned with multiple sets of phase-based access permission settings with different sets of settings corresponding to different roles. Then, when the computing platform receives the information identifying the role of the second party, the computing platform may map the second party's role to the corresponding set of phase-based access permission settings.

The computing platform may provide a mechanism for the first party to configure the phase-based access permission settings for a given role. For instance, the computing platform may provide an interface through which the first party may adjust the phase-based access permission settings for a pre-existing role and/or through which the first party may create a new role and assign corresponding phase-based access permission settings.

Figure 6:
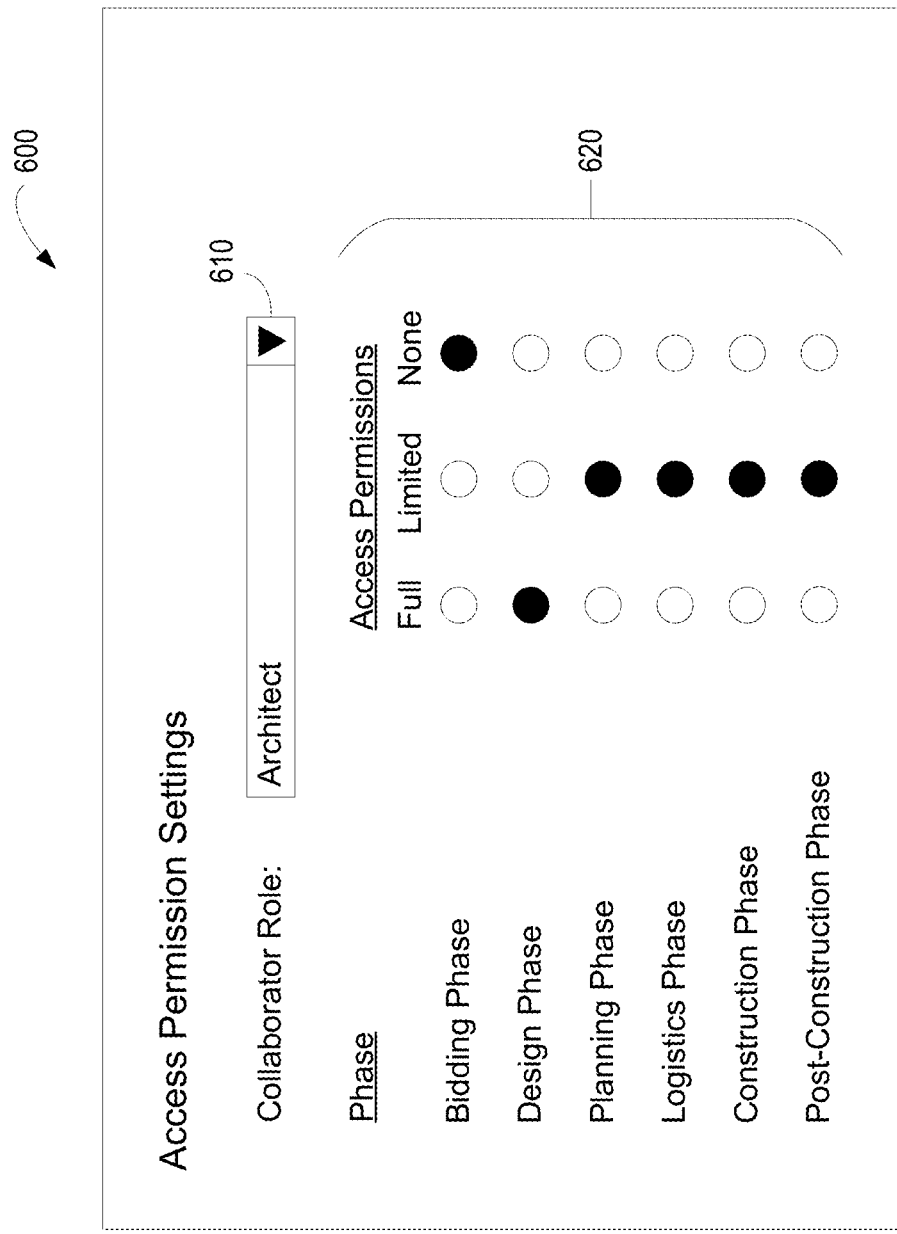
FIG. 6 depicts an example interface that may be presented to a party in order to specify phase-based access permissions for parties related to a construction project.

FIG. 6 depicts an example interface 600 that the computing platform may provide to the first party for configuring phase-based access permission settings for a multi-phase construction project. In order to access the interface 600, the first party may access the construction management SaaS application via a client station (such as one of the client stations 112) that communicates with a back-end computing platform (such as the back-end platform 102) hosting the SaaS application. The first party's client station may present a graphical user interface ("GUI"), which the project owner may use to navigate to the interface 600. In some examples, the interface 600 may be presented to the first party when the first party is inviting the second party to collaborate on the project. In other examples, the interface 600 may be presented during creation of the project entity or during creation of its associated data objects. In other examples, the interface 600 may be accessible through a settings menu of the project entity and/or its associated data objects.

As shown, the interface 600 includes a role input field 610 for inputting a given role for which the phase-based access permission settings are to apply. The role input field 610 may take the form of a dropdown menu that is prepopulated with a default set of roles that are predefined for the multi-phase construction project. As mentioned previously, the role of a party may include the party's job function, department, employer, industry, or any other categorization that may be useful when defining access permissions settings for multiple parties in a similar way. In the present example, the specified role shown in FIG. 6 is that of "Architect," but this is for illustrative purposes only, and other example roles are possible as well. Further, in some examples, the interface 600 may allow the first party to create a new role and corresponding phase-based access permissions by inputting a new collaborator role into the role input field 610.

As further shown in FIG. 6, the interface 600 may include a set of phase-based access permission settings 620. The set of phase-based access permission settings 620 may include a separate access permission setting for each phase of the multi-phase construction project. For instance, as shown, the set of phase-based access permission settings 620 include respective access permission settings for a bidding phase, a design phase, a planning phase, a logistics phase, a construction phase, and a post-construction phase, which are examples of phases that may be included in a multi-phase construction project, as previously described.

Further, the set of phase-based access permission settings 620 may define a respective scope of access for each corresponding phase of the multi-phase construction project. The scope of access may be categorized into different levels. In the example depicted in FIG. 6, the scope of access for a given phase may be categorized as "full," "limited," or "none." As one example, "full" access permissions may permit a collaborator to access all project data related to the project entity and perform all permissible actions with respect to the project data. As another example, "limited" access permissions may permit the collaborator to access only project data that is specifically shared with the given collaborator and perform only certain permissible actions with respect to that project data. As yet another example, access permissions set to "none" may prevent the collaborator from accessing the project data entirely.

In this manner, the first party may use the interface 600 to configure phase-based access permissions for a given collaborator role by specifying the role via the role input 610 and by inputting the collaborator's scope of access for each phase of the multi-phase construction project via the phase-based access permission settings 620. In the example depicted in FIG. 6, the phase-based access permission settings for the Architect role include no access during the bidding phase, full access during the design phase, and limited access for all phases after the design phase. This may be a useful configuration because architects typically may not be involved in a construction project until the design phase, during which architects design the overall shape and layout of the construction project. Then, after the design phase, architects may not be substantively involved in the construction project but may still desire access to their work product. As such, setting their scope of access to limited may allow the architect to access their drawings in a limited capacity, such as in a read-only mode, while restricting the architects from substantively affecting the construction project by creating, modifying, or deleting data objects related to the project. However, this example is merely illustrative, and other examples are possible as well.

While the example functionality described above in connection with FIG. 6 relates to determining phase-based access permissions for an entire project as a whole, the computing platform may additionally or alternatively be configured to determine phase-based access permissions for individual data objects or software features associated with a multi-phase construction project. For instance, the computing platform may provide a mechanism for the first party to input, or may otherwise be provisioned with, respective access permission settings that correspond to individual data objects or software features during each phase of the multi-phase project for a given collaborator role.

Figure 7:
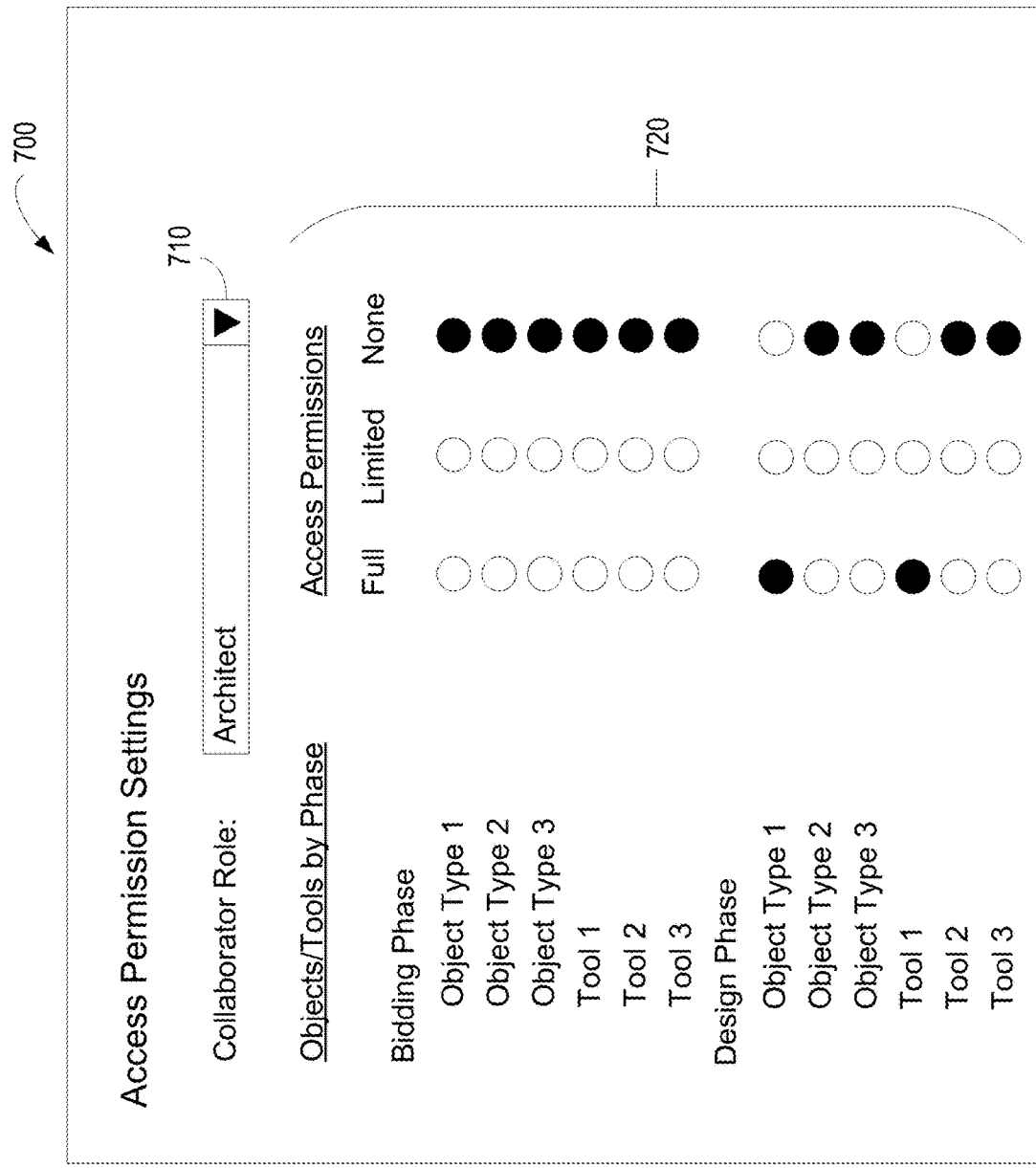
FIG. 7 depicts an example interface that may be presented to a party in order to specify phase-based access permissions for parties related to a construction project.

FIG. 7 depicts an example interface 700 that the computing platform may provide to the first party for configuring access permission settings that correspond to individual data objects or software features during each phase of the multi-phase project. As shown, the interface 700 includes a role input field 710 for inputting a given role for which the phase-based access permission settings are to apply. This role input field 710 may be similar to or the same as the role input field 610 depicted in FIG. 6 and may function in a manner that is similar or the same. Further, the interface 700 may likewise include a set of phase-based access permission settings 720 for defining different scopes of access permissions. Again, the scopes of access permissions defined by the set of phase-based access permission settings 720 may be similar to or the same as the scopes of access permissions defined by the set of phase-based access permission settings 620 depicted in FIG. 6.

However, unlike the set of phase-based access permission settings 620 depicted in FIG. 6, the set of phase-based access permission settings 720 depicted in FIG. 7 include a separate access permission setting for individual data object types and for individual software tools for each phase of the multi-phase construction project. In this manner, the first party may use the interface 700 to configure phase-based access permissions for a given collaborator role to specific object types and/or software tools by specifying the role via the role input 710 and by inputting the collaborator's scope of access for each object type and/or software tool for each phase of the multi-phase construction project via the phase-based access permission settings 720.

In the example depicted in FIG. 7, the phase-based access permission settings for the Architect role include no access to any data object types or software tools during the bidding phase, and full access to "Object Type 1" and "Tool 1" during the design phase. This additional level of granularity for phase-based access permissions may be useful for further restricting a collaborator's access to only those data objects and software tools that are applicable to the collaborator's role with respect to the multi-phase construction project. For instance, continuing with the Architect role example, it may be desirable to limit an architect's access to data objects that correspond to architectural drawings and to software tools for creating and modifying architectural drawings. Further, it should be understood that, while the example interface 700 depicted in FIG. 7 only shows access permission settings for the bidding and design phases of the multi-phase construction project, this interface 700 has been simplified for illustrative purposes and, in practice, may include access permission settings for additional (e.g., all) phases of the construction project, as well as for additional data object types and/or software tools.

As yet another possibility, the computing platform may be configured to determine phase-based access permissions for a specific party, instead of for an entire party role. For instance, instead of identifying a role, such as by using the role input fields 610 and 710 shown in the interfaces 600 and 700 depicted in FIGS. 6 and 7, the first party may identify a specific second party, such as by using a party input field. The first party may then configure the phase-based access permissions for the second party in the same manner as described above in connection with FIGS. 6 and 7.

Further, while the interfaces 600 and 700 depicted in FIGS. 6 and 7 provide example mechanisms through which the computing platform may receive data indicating phase-based access permission settings for the second party, it should be understood that these examples are merely illustrative and the computing platform may receive such data in other forms as well.

At step 504, while the multi-phase construction project is in a first phase, the computing platform may apply a first set of access permission settings that defines whether and/or to what extent the second party can access data objects related to the multi-phase construction project during the first phase. To facilitate this, the computing platform may be configured to determine that the multi-phase project is in the first phase, which the computing platform may do in various manners.

As one possibility, the computing platform may store phase status data for the construction project (e.g., as part of the project entity), in which case the computing platform may determine a current phase of the multi-phase construction project by accessing the stored phase status data and then determining the current phase based on the phase status data. In some examples, the phase status data may be based on a user input that specifies the current phase of the project. For instance, the first party may have previously accessed a settings menu of the project through which the first party may specify certain characteristics of the project, including its current phase. As such, the computing platform may store, as part of the project entity, phase status data corresponding to the specified phase.

As another possibility, the computing platform may infer a current phase of the multi-phase construction project based on timing information or user activity in connection with the project entity. For instance, if the project entity is currently being created or was recently created within a threshold time period, the computing platform may infer that the construction project is in an initial phase, such as a bidding phase. As another example, the computing platform may determine that a contractor uploaded a bid in connection with the project entity and, based on this determination, the computing platform may infer that the construction project is in the bidding phase. It should be understood that these examples are merely illustrative and that other examples of using timing information or user activity to infer the current phase of the project are contemplated herein as well.

In any case, once the computing platform has determined that the multi-phase project is in the first phase, the computing platform may apply the first access permission setting that defines how the second party can access data objects related to the multi-phase construction project during the first phase. The computing platform may apply the first access permission setting in various manners.

As one possibility, the computing platform may apply the first access permission setting when a request is made by the second party that gives rise to a need to check access permissions, such as a request to access a particular data object or software tool related to the project entity. When checking the second party's access permissions to determine whether to grant access to the particular data object or software tool, the computing platform may reference a set of phase-based access permission settings for the second party. For instance, in line with the discussion above, the second party may have an assigned role indicator, and the computing platform may map the second party's role to a corresponding set of phase-based access permissions. The set of phase-based access permissions may be a predefined set of default phase-based access permissions, or they may be a customized set of phase-based access permissions, such as those depicted in FIGS. 6 and 7. Regardless, the set of phase-based access permissions may specify access permissions for any given phase of the multi-phase construction project.

When referencing the set of phase-based access permissions, the computing platform could either reference a centralized set of phase-based access permissions that the computing platform maintains on a project level, or the computing platform could reference a distributed set of phase-based access permissions that are encoded into the connections for the project's data objects. In examples where the phase-based access permissions are encoded into the data objects connections, the encoded information may include access permissions information for all phases of the multi-phase construction project, or the encoded information may include access permissions information for only the current phase of the multi-phase construction project. In the latter case, the computing platform may be configured to update the encoded access permissions information in the connections each time the multi-phase construction project changes phases.

Once the computing platform references the set of phase-based access permissions, the computing platform may process the request to access the particular data object or software tool in accordance with the access permission settings for the first phase (i.e., the first access permission setting). To illustrate, consider an example in which the first phase is a bidding phase, the second party is assigned the Architect role, and the first party has configured the set of phase-based access permissions to reflect those depicted FIG. 6. The computing platform may determine that the multi-phase construction project is in the bidding phase in one of the manners described above in connection with step 504 of the process 500 depicted in FIG. 5. While in the bidding phase, the second party may request access to the project data entity representing the multi-phase construction project, or the second party may request access to a data object or software tool related to the project data entity. In response to this request, because the second party is assigned the Architect role, the computing platform may reference data that identifies the set of phase-based access permission settings 620 that correspond to the Architect role and process the second party's access request in accordance with the access permission setting that corresponds to the bidding phase. In this example, because the set of phase-based access permission settings 620 allow no access to the project for the Architect role during the bidding phase, the computing platform may deny the second party's access request and prevent the second party from accessing the project data entity and/or the data object or software tool related to the project data entity.

To illustrate further, consider another example in which the first phase is the bidding phase, the second party is assigned the Architect role, and the first party has configured the set of phase-based access permissions to reflect those depicted FIG. 7. The computing platform may determine that the multi-phase construction project is in the bidding phase in one of the manners described above in connection with step 504 of the process 500 depicted in FIG. 5. While in the bidding phase, the second party may request access to "Software Tool 1" or to a data object of type "Object Type 1." In response to this request, because the second party is assigned the Architect role, the computing platform may reference data that identifies the set of phase-based access permission settings 720 that correspond to the Architect role and process the second party's access request in accordance with the access permission setting that corresponds to the bidding phase. In this example, because the set of phase-based access permission settings 720 allow no access to Software Tool 1 and Object Type 1 data objects for the Architect role during the bidding phase, the computing platform may deny the second party's access request and prevent the second party from accessing Software Tool 1 and/or the Object Type 1 data object.

At step 506, the computing platform may determine that the multi-phase construction project has transitioned from the first phase to a second phase. The computing platform may make this determination in various manners.

As one possibility, the computing platform may determine that the project has transitioned from the first phase to the second phase based on input by the project owner. For instance, as described above, the project owner may specify the phase of the construction project at any given time by accessing a settings menu for the construction project and inputting information representing the phase of the construction project. Thus, in some examples, the computing platform may detect the phase transition in response to receiving a user input that changes the identified phase of the construction project from one phase to another.

As another possibility, the computing platform may infer a phase transition from the current phase to a next phase of the multi-phase construction project, such as based on user activity in connection with the project entity. For instance, the computing platform may infer a phase transition based on the project owner or some collaborator updating or adding information associated with the project entity that is associated with the end of one phase and/or the beginning of another. For instance, as described above, the multi-phase construction project may include a bidding phase during which contractors submit bids to perform the construction work, followed by a design phase during which architects design aspects of the construction project. In such an example, while the project is in the bidding phase, if the project owner or some authorized collaborator inputs information identifying that a submitted bid has been accepted, then the computing platform may infer from this accepted bid that the bidding phase is complete and the project is ready to transition to the design phase. As another example, the multi-phase construction project may include a construction phase during which construction professionals build the construction project, followed by a post-construction phase during which project closeout processes are performed, such as identifying and resolving any punch list items. In such an example, while the project is in the construction phase, if the project owner or a collaborator creates or uploads a punch list document associated with the project entity, then the computing platform may infer that the project has transitioned from the construction phase to the post-construction phase.

It should be understood that these examples are merely illustrative and that other examples of inferring phase transitions based on user activity in connection with the project entity are contemplated herein as well.

Additionally or alternatively, the computing platform may use machine learning to infer the phase transition. The computing platform may build, or otherwise be provisioned with, a machine learning model that is trained using data from historical construction projects. In this manner, various events or other data from the historical construction projects can be used as inputs for the model, and these inputs can be mapped to particular phases of the construction projects which represent the outputs of the model. Examples of inputs for the model can include events corresponding to the creation or modification of certain types of data objects, a quantity of certain types of data objects associated with the project, such as a number of RFIs and/or their statuses, a number of contacts in the directory of the project, and/or information quantifying a rate of change of various data objects associated with the project. In some examples, this approach can involve supervised machine learning in which the model is trained to map the inputs to known phases of the historical construction projects. In other examples, this approach can involve unsupervised learning in which phase commonalities are derived from the model inputs without having prior knowledge of the corresponding phases of the projects.

Whether inferring a phase transition based on user activity or based on a machine learning model, there may be situations where the computing platform could incorrectly infer the phase change. To account for such inaccuracies, the computing platform may be configured to display a user prompt for confirming whether the project has transitioned phases. The computing platform may display the prompt to the project owner (i.e., the first party) or to some authorized collaborator. Based on receiving the prompt, the project owner may manually change the phase of the construction project, such as by accessing a settings menu for the construction project and inputting information representing the phase of the construction project as described above. Alternatively, the project owner may confirm the phase transition by interacting with the prompt, such as by selecting an approval button or the like, and the computing platform may automatically update the information representing the phase of the construction project to match the newly inferred phase.

Further, in some implementations, when the computing platform has determined that the multi-phase construction project has transitioned from the first phase to the second phase, the computing platform may update access permissions data based on this determination. This can be useful, for instance, in examples where access permissions data is encoded into the connections for the project's data objects and the encoded data includes access permissions data for only the current phase of the multi-phase construction project. In such examples, when the computing platform determines that the multi-phase construction project has transitioned to a new phase, the computing platform may update the encoded access permissions data in the connections to reflect the access permissions settings for the new phase. However, in implementations where the access permissions data is not encoded into the connections for the project's data objects, or where the encoded data includes access permissions data for all phases of the multi-phase construction project, it may not be necessary to update access permissions data based on the determination of the phase transition.

At step 508, while the multi-phase construction project is in the second phase, the computing platform may apply a second access permission setting that defines whether and/or to what extent the second party can access data objects related to the multi-phase construction project during the second phase. In some examples, the computing platform may apply the second access permission setting responsive to determining that the multi-phase construction project has transitioned from the first phase to the second phase. The computing platform may apply the second access permission setting in various manners, such as in a similar manner as applying the first access permission setting as described above in connection with step 504.

For instance, as one possibility, the computing platform may apply the second access permission setting when a request is made by the second party that gives rise to a need to check access permissions, such as a request to access a particular data object or software tool related to the project entity. When checking the second party's access permissions to determine whether to grant access to the particular data object or software tool, the computing platform may reference a set of phase-based access permission settings for the second party. For instance, in line with the discussion above, the second party may have an assigned role indicator, and the computing platform may map the second party's role to a corresponding set of phase-based access permissions. The set of phase-based access permissions may be a predefined set of default phase-based access permissions, or they may be a customized set of phase-based access permissions, such as those depicted in FIGS. 6 and 7. Regardless, the set of phase-based access permissions may specify access permissions for any given phase of the multi-phase construction project.

When referencing the set of phase-based access permissions, the computing platform could either reference a centralized set of phase-based access permissions that the computing platform maintains on a project level, or the computing platform could reference a distributed set of phase-based access permissions that are encoded into the connections for the project's data objects. In examples where the phase-based access permissions are encoded into the data objects connections, the encoded information may include access permissions information for all phases of the multi-phase construction project, or the encoded information may include access permissions information for only the current phase of the multi-phase construction project. In the latter case, the computing platform may be configured to update the encoded access permissions information in the connections each time the multi-phase construction project changes phases.

Once the computing platform references the set of phase-based access permissions, the computing platform may process the request to access the particular data object or software tool in accordance with the access permission settings for the second phase (i.e., the second access permission setting). To illustrate, consider an example in which the second phase is a design phase, the second party is assigned the Architect role, and the first party has configured the set of phase-based access permissions to reflect those depicted FIG. 6. The computing platform may determine that the multi-phase construction project has transitioned to the design phase in one of the manners described above in connection with step 506 of the process 500 depicted in FIG. 5. While in the design phase, the second party may request access to the project data entity representing the multi-phase construction project, or the second party may request access to a data object or software tool related to the project data entity. In response to this request, because the second party is assigned the Architect role, the computing platform may reference data that identifies the set of phase-based access permission settings 620 that correspond to the Architect role and process the second party's access request in accordance with the access permission setting that corresponds to the design phase. In this example, because the set of phase-based access permission settings 620 allow full access to the project for the Architect role during the bidding phase, the computing platform may grant the second party's access request and allow the second party to access the project data entity and/or the data object or software tool related to the project data entity. Further, because the set of phase-based access permission settings specify a "full" scope of access, the computing platform may permit the second party to access all project data related to the project entity and perform all permissible actions with respect to the project data.

To illustrate further, consider another example in which the second phase is the design phase, the second party is assigned the Architect role, and the first party has configured the set of phase-based access permissions to reflect those depicted FIG. 7. The computing platform may determine that the multi-phase construction project has transitioned to the design phase in one of the manners described above in connection with step 506 of the process 500 depicted in FIG. 5. While in the design phase, the second party may request access to "Software Tool 1" or to a data object of type "Object Type 1." In response to this request, because the second party is assigned the Architect role, the computing platform may reference data that identifies the set of phase-based access permission settings 720 that correspond to the Architect role and process the second party's access request in accordance with the access permission setting that corresponds to the design phase. In this example, because the set of phase-based access permission settings 720 allow full access to Software Tool 1 and Object Type 1 data objects for the Architect role during the design phase, the computing platform may grant the second party's access request and allow the second party full access to Software Tool 1 and/or the Object Type 1 data object.

While the examples of applying the first access permission setting and the second access permission setting described above in connection with steps 504 and 508 of the process 500 define the first phase as the bidding phase and the second phase as the design phase, the first and second phase can be other phases of the multi-phase construction project as well. Further, the techniques described above can be applied repeatedly as the multi-phase construction project transitions through all phases of the construction project. For instance, based on the set of access permissions 620 depicted in FIG. 6, the computing platform may determine when the project transitions from the design phase to the planning phase and responsively reduce the second party's access permissions from full access to a limited access. As further dictated by the set of access permissions 620 depicted in FIG. 6, the computing platform may continue to provide the second party with limited access to the project throughout the remaining phases of the project as well.

Additionally, there may be situations in which a construction project is so complex that the project is conceptually broken up into multiple subprojects that make up the overall construction project. In these situations, the construction management SaaS application may allow the project owner to create separate subproject data entities for each subproject, and these subproject entities may be included within the overall project data entity in the data management structures depicted in FIGS. 3 and 4. In this manner, each subproject may have its own set of related software features and data objects. Further, each subproject may have its own set of phases, and the computing platform may apply the phase-based access permissions techniques disclosed herein in connection with each subproject. This may be done in addition to, or in the alternative to, applying phase-based access permissions to the overall project data entity.

In the ways discussed above, employing the disclosed software technology may enable a construction management SaaS application to more efficiently facilitate data management and collaboration for a construction project by automatically adjusting access permission settings based on phase transitions in a multi-phase construction project.

IV. Conclusion

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed software technology may be implemented in areas other than construction and construction-related projects and may be used in other ways as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing system comprising:
   at least one processor;
   data storage comprising at least one non-transitory computer-readable medium; and
   program instructions stored in the data storage that are executable by the at least one processor such that the computing system is configured to:
   transmit, to a first client device associated with a first user, a first network communication that causes the first client device to present a user interface for inputting role-based access permission settings for data objects associated with a multi-phase construction project that are stored within the computing system;
   receive, from the first client device, a second network communication comprising at least (i) a first access permission setting for a given role on the multi-phase construction project that defines an extent to which any user having the given role can access data objects associated with the multi-phase construction project during a first phase of the multi-phase construction project and (ii) a second access permission setting for the given role on the multi-phase construction project that defines an extent to which any user having the given role can access data objects associated with the multi-phase construction project during a second phase of the multi-phase construction project, wherein each of the first access permission setting and the second access permission setting for the given role on the multi-phase construction project comprises a respective permission level that is selected by the first user from a predefined set of access permission levels presented via the user interface, and wherein the second access permission setting comprises a more restricted access permission level than the first access permission setting;

store the first access permission setting and the second access permission setting for the given role on the multi-phase construction project in the data storage;

during the first phase of the multi-phase construction project, receive, from a second client device associated with a second user having the given role on the multi-phase construction project, a third network communication indicating a first request by the second user to access at least a first data object associated with the multi-phase construction project;

based on the second user having the given role and the multi-phase construction project being in the first phase, (i) determine that the first request by the second user is to be governed by the first access permission setting, (ii) access the first access permission setting from the data storage, and (iii) in accordance with the first access permission setting, grant the first request by the second user to access the first data object associated with the multi-phase construction project;

analyze data associated with the multi-phase construction project using a supervised machine learning model that has been trained to predict a phase of a given construction project based on data associated with the given construction project and thereby determine that the multi-phase construction project has transitioned from the first phase to the second phase;

after determining that the multi-phase construction project has transitioned from the first phase to the second phase, receive, from the second client device, a fourth network communication indicating a second request by the second user to access at least a second data object associated with the multi-phase construction project; and based on the second user having the given role and the determination that the multi-phase construction project has transitioned from the first phase to the second phase, (i) determine that the second request by the second user is to be governed by the second access permission setting, (ii) access the second access permission setting from the data storage, and (iii) in accordance with the second access permission setting, deny the second request by the second user to access the second data object associated with the multi-phase construction project.

2. The computing system of claim 1, wherein the computing system further comprises program instructions stored in the data storage that are executable by the at least one processor such that the computing system is configured to:
prior to transmitting the first network communication that causes the first client device to present the user interface, receive a request from the first client device to invite the second user to collaborate on the multi-phase construction project.

3. The computing system of claim 1, wherein the data associated with the multi-phase construction project that is analyzed using the supervised machine learning model comprises a given data object that is associated with (i) an end of the first phase of the multi-phase construction project or (ii) the second phase of the multi-phase construction project.

4. The computing system of claim 1, wherein the predefined set of access permission levels comprises (i) a first level defining a full scope of access to data objects associated with the multi-phase construction project, (ii) a second level defining a limited scope of access to data objects associated with the multi-phase construction project, and (iii) a third level defining no access to data objects associated with the multi-phase construction project.

5. A non-transitory computer-readable medium, wherein the non-transitory computer-readable medium is provisioned with program instructions that, when executed by at least one processor, cause a computing system to:
transmit, to a first client device associated with a first user, a first network communication that causes the first client device to present a user interface for inputting role-based access permission settings for data objects associated with a multi-phase construction project that are stored within the computing system;

receive, from the first client device, a second network communication comprising at least (i) a first access permission setting for a given role on the multi-phase construction project that defines an extent to which any user having the given role can access data objects associated with the multi-phase construction project during a first phase of the multi-phase construction project and (ii) a second access permission setting for the given role on the multi-phase construction project that defines an extent to which any user having the given role can access data objects associated with the multi-phase construction project during a second phase of the multi-phase construction project, wherein each of the first access permission setting and the second access permission setting for the given role on the multi-phase construction project comprises a respective permission level that is selected by the first user from a predefined set of access permission levels presented via the user interface, and wherein the second access permission setting comprises a more restricted access permission level than the first access permission setting;

store the first access permission setting and the second access permission setting for the given role on the multi-phase construction project in data storage of the computing system;

during the first phase of the multi-phase construction project, receive, from a second client device associated with a second user having the given role on the multi-phase construction project, a third network communication indicating a first request by the second user to access at least a first data object associated with the multi-phase construction project;

based on the second user having the given role and the multi-phase construction project being in the first phase, (i) determine that the first request by the second user is to be governed by the first access permission setting, (ii) access the first access permission setting from the data storage, and (iii) in accordance with the first access permission setting, grant the first request by the second user to access the first data object associated with the multi-phase construction project;

analyze data associated with the multi-phase construction project using a supervised machine learning model that has been trained to predict a phase of a given construction project based on data associated with the given construction project and thereby determine that the multi-phase construction project has transitioned from the first phase to the second phase;

after determining that the multi-phase construction project has transitioned from the first phase to the second phase, receive, from the second client device, a fourth network communication indicating a second request by the second user to access at least a second data object associated with the multi-phase construction project; and based on the second user having the given role and the determination that the multi-phase construction project has transitioned from the first phase to the second phase, (i) determine that the second request by the second user is to be governed by the second access permission setting, (ii) access the second access permission setting from the data storage, and (iii) in accordance with the second access permission setting, deny the second request by the second user to access the second data object associated with the multi-phase construction project.

6. The non-transitory computer-readable medium of claim 5, wherein the non-transitory computer-readable medium is further provisioned with program instructions that, when executed by the at least one processor, cause the computing system to:

prior to transmitting the first network communication that causes the first client device to present the user interface, receive a request from the first client device to invite the second user to collaborate on the multi-phase construction project.

7. The non-transitory computer-readable medium of claim 5, wherein the data associated with the multi-phase construction project that is analyzed using the supervised machine learning model comprises a given data object that is associated with (i) an end of the first phase of the multi-phase construction project or (ii) the second phase of the multi-phase construction project.

8. The non-transitory computer-readable medium of claim 5, wherein the predefined set of access permission levels comprises (i) a first level defining a full scope of access to data objects associated with the multi-phase construction project, (ii) a second level defining a limited scope of access to data objects associated with the multi-phase construction project, and (iii) a third level defining no access to data objects associated with the multi-phase construction project.

9. A method carried out by a computing system, the method comprising:

transmitting, to a first client device associated with a first user, a first network communication that causes the first client device to present a user interface for inputting role-based access permission settings for data objects associated with a multi-phase construction project that are stored within the computing system;

receiving, from the first client device, a second network communication comprising at least (i) a first access permission setting for a given role on the multi-phase construction project that defines an extent to which any user having the given role can access data objects associated with the multi-phase construction project during a first phase of the multi-phase construction project and (ii) a second access permission setting for the given role on the multi-phase construction project that defines an extent to which any user having the given role can access data objects associated with the multi-phase construction project during a second phase of the multi-phase construction project, wherein each of the first access permission setting and the second access permission setting for the given role on the multi-phase construction project comprises a respective permission level that is selected by the first user from a predefined set of access permission levels presented via the user interface, and wherein the second access permission setting comprises a more restricted access permission level than the first access permission setting;

storing the first access permission setting and the second access permission setting for the given role on the multi-phase construction project in data storage of the computing system;

during the first phase of the multi-phase construction project, receiving, from a second client device associated with a second user having the given role on the multi-phase construction project, a third network communication indicating a first request by the second user to access at least a first data object associated with the multi-phase construction project;

based on the second user having the given role and the multi-phase construction project being in the first phase, (i) determining that the first request by the second user is to be governed by the first access permission setting, (ii) accessing the first access permission setting from the data storage, and (iii) in accordance with the first access permission setting, granting the first request by the second user to access the first data object associated with the multi-phase construction project;

analyzing data associated with the multi-phase construction project using a supervised machine learning model that has been trained to predict a phase of a given construction project based on data associated with the given construction project and thereby determining that the multi-phase construction project has transitioned from the first phase to the second phase;

after determining that the multi-phase construction project has transitioned from the first phase to the second phase, receiving, from the second client device, a fourth network communication indicating a second request by the second user to access at least a second data object associated with the multi-phase construction project; and based on the second user having the given role and the determination that the multi-phase construction project has transitioned from the first phase to the second phase, (i) determining that the second request by the second user is to be governed by the second access permission setting, (ii) accessing the second access permission setting from the data storage, and (iii) in accordance with the second access permission setting, denying the second request by the second user to access the second data object associated with the multi-phase construction project.

10. The method of claim 9, further comprising:

prior to transmitting the first network communication that causes the first client device to present the user interface, receiving a request from the first client device to invite the second user to collaborate on the multi-phase construction project.

11. The method of claim 9,
wherein the data associated with the multi-phase construction project that is analyzed using the supervised machine learning model comprises a given data object that is associated with (i) an end of the first phase of the multi-phase construction project or (ii) the second phase of the multi-phase construction project.

12. The method of claim 9, wherein the predefined set of access permission levels comprises (i) a first level defining a full scope of access to data objects associated with the multi-phase construction project, (ii) a second level defining a limited scope of access to data objects associated with the multi-phase construction project, and (iii) a third level defining no access to data objects associated with the multi-phase construction project.

* * * * *